(12) United States Patent
Song et al.

(10) Patent No.: US 11,967,044 B2
(45) Date of Patent: Apr. 23, 2024

(54) DEVICE AND METHOD FOR UPSCALING RESOLUTION BASED ON SLICE IMAGE

(71) Applicant: SILICON WORKS CO., LTD., Daejeon (KR)

(72) Inventors: Byung Cheol Song, Daejeon (KR); Dong Yoon Choi, Daejeon (KR); Ji Yun Park, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 491 days.

(21) Appl. No.: 17/210,818

(22) Filed: Mar. 24, 2021

(65) Prior Publication Data

US 2021/0304358 A1   Sep. 30, 2021

(30) Foreign Application Priority Data

Mar. 30, 2020   (KR) ........................ 10-2020-0038173

(51) Int. Cl.
*G06T 3/40*   (2006.01)
*G06T 3/4046*   (2024.01)
*G06T 3/4053*   (2024.01)

(52) U.S. Cl.
CPC .......... *G06T 3/4053* (2013.01); *G06T 3/4046* (2013.01)

(58) Field of Classification Search
CPC ................ G06T 3/4046; G06T 3/4053; G06T 2207/20081; G06T 2207/20084; G06N 3/02–0985

See application file for complete search history.

(56) References Cited

U.S. PATENT DOCUMENTS

| | | | | |
|---|---|---|---|---|
| 2020/0051211 A1* | 2/2020 | Shiokawa | .............. | G06N 3/045 |
| 2020/0336699 A1* | 10/2020 | Kim | ...................... | G09G 5/005 |
| 2023/0141157 A1* | 5/2023 | Otsuka | ...................... | G06T 9/00 |
| | | | | 345/428 |

FOREIGN PATENT DOCUMENTS

| | | |
|---|---|---|
| KR | 10-2019-0087262 A | 7/2019 |
| KR | 10-2019-0112384 A | 10/2019 |

OTHER PUBLICATIONS

Chowdhury, Debjoy, and Dimitrios Androutsos. "Single image super-resolution via cascaded parallel multisize receptive field." 2019 IEEE International Conference on Image Processing (ICIP). IEEE, 2019. (Year: 2019).*

(Continued)

*Primary Examiner* — Geoffrey E Summers
(74) *Attorney, Agent, or Firm* — Greenberg Traurig, LLP

(57) ABSTRACT

Provided is a device for upscaling resolution based on a slice image, in which a low-resolution image is divided into a plurality of slice images so that a high-resolution image is generated. The device includes a convolution operation unit configured to convert a low-resolution input slice image into a high-resolution output slice image using a convolutional neural network. The convolutional neural network includes a cascading block configured to perform a convolution operation using a convolution filter having a predetermined size and a residual operation on an input feature map generated from the low-resolution input slice image to generate an output feature map, and an upscaling block configured to upscale the output feature map to generate the high-resolution output slice image.

19 Claims, 11 Drawing Sheets

(56) References Cited

OTHER PUBLICATIONS

Shi, Wenzhe, et al. "Real-Time Single Image and Video Super-Resolution Using an Efficient Sub-Pixel Convolutional Neural Network." 2016 IEEE Conference on Computer Vision and Pattern Recognition (CVPR). IEEE, 2016. (Year: 2016).*

Hu, Yanting, et al. "Single image super-resolution via cascaded multi-scale cross network." arXiv preprint arXiv:1802.08808v1 (2018). (Year: 2018).*

Kim, Yongwoo, Jae-Seok Choi, and Munchurl Kim. "A real-time convolutional neural network for super-resolution on FPGA with applications to 4K UHD 60 fps video services." IEEE Transactions on Circuits and Systems for Video Technology 29.8 (2018): 2521-2534. (Year: 2018).*

* cited by examiner

DEVICE AND METHOD FOR UPSCALING RESOLUTION BASED ON SLICE IMAGE

CROSS-REFERENCE TO RELATED APPLICATIONS

This application claims the benefit of the Korean Patent Application No. 10-2020-0038173 filed on Mar. 30, 2020, which is hereby incorporated by reference as if fully set forth herein.

FIELD

The present disclosure relates to image processing, and more specifically, to a technique for increasing the resolution of an image.

BACKGROUND

Recently, display devices capable of outputting images up to 8K resolution beyond 4K resolution, which is ultra-high-definition (UHD) resolution, are being released. However, compared to the resolution of the display device, conventional broadcasting content and video content is produced only in 2K or 4K resolution, and thus a technique for converting a low-resolution (LR) image into a high-resolution (HR) image is being developed.

As an example of the image conversion technique, a single image super-resolution (SISR) technique has been proposed. SISR refers to a technique for generating a HR image corresponding to a single LR image. In particular, recently, with the development of deep learning technology, SISR techniques using a convolutional neural network (CNN) are common.

However, conventional CNN-based SISR algorithms have many layer and filters, and thus there is a limitation in that the conventional CNN-based SISR algorithms are not suitable for system-on-chip (SoC) implementation because the number of memories and an amount of computation are inevitably increased.

SUMMARY

The present disclosure is designed to solve the above problems and is for providing a device and method for upscaling resolution based on a slice image, in which a low-resolution image is divided into a plurality of slice images so that a high-resolution image is generated.

The present disclosure is also for providing a device and method for upscaling resolution based on a slice image, in which a size of a vertical receptive field is reduced by adjusting a size of a convolution filter.

The present disclosure is also for providing a device and method for upscaling resolution based on a slice image, in which, when a neural network is trained, parameters of a convolution filter are adjusted using loss functions based on similarity between pixels in an original image and similarity between pixels in an output image.

One aspect of the present disclosure provides a device for upscaling resolution based on a slice image including a convolution operation unit configured to convert a low-resolution input slice image into a high-resolution output slice image using a convolutional neural network. The convolutional neural network includes a cascading block configured to perform a convolution operation using a convolution filter having a predetermined size and a residual operation on an input feature map generated from the low-resolution input slice image to generate an output feature map, and an upscaling block configured to upscale the output feature map to generate the high-resolution output slice image.

Another aspect of the present disclosure provides a method of upscaling resolution based on a slice image including dividing a low-resolution input image and acquiring a plurality of low-resolution input slice images, performing a convolution operation using a convolution filter having a predetermined size and a residual operation on an input feature map generated from the low-resolution input slice images through a convolutional neural network and generating an output feature map, upscaling the output feature map and generating a high-resolution output slice image, and sequentially concatenating the high-resolution output slice images corresponding to the low-resolution input slice images and generating a high-resolution output image.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
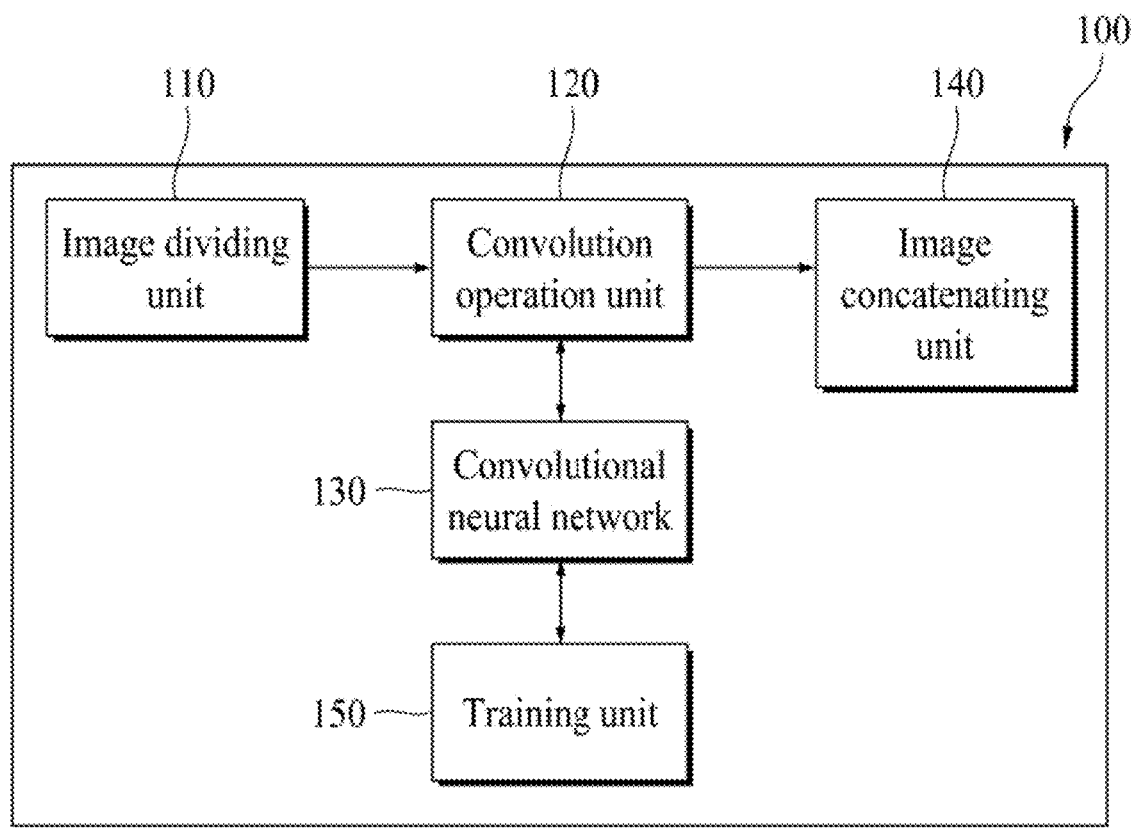
FIG. 1 is a schematic block diagram illustrating a configuration of a device for upscaling resolution based on a slice image according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~%', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of this specification will be described in detail with reference to the accompanying drawings.

FIG. 1 is a block diagram illustrating a device for upscaling resolution based on a slice image according to an embodiment of the present disclosure. An upscaling device 100 based on a slice image (hereinafter, referred to as a "upscaling device") illustrated in FIG. 1 uses a super-resolution (SR) technique based on a convolutional neural network (CNN) to convert a low-resolution (LR) input image into a high-resolution (HR) output image.

In particular, the upscaling device 100 according to the present disclosure may acquire a plurality of input slice images from a LR input image to realize super resolution on the basis of the slice images. To this end, the upscaling device 100 according to the present disclosure includes an image dividing unit 110, a convolution operation unit 120, a CNN 130, an image concatenating unit 140, and a training unit 150, as illustrated in FIG. 1.

Figure 2:
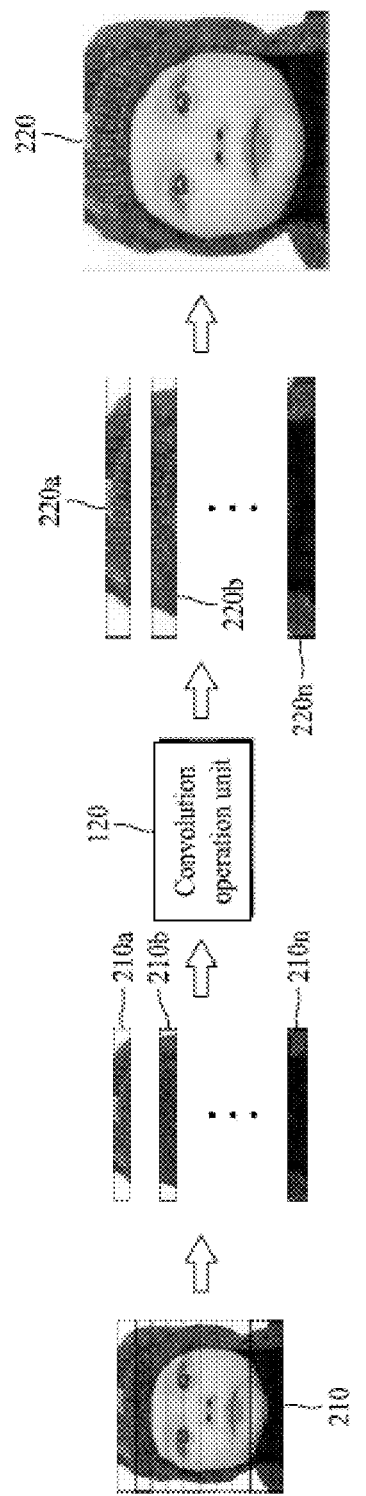
FIG. 2 is a conceptual diagram illustrating a process in which a low-resolution input slice image is upscaled to a high-resolution output slice image through a convolution network according to the present disclosure.

The image dividing unit 110 receives a LR input image from an external device and acquires a plurality of input slice images from the received input image. Specifically, as illustrated in FIG. 2, the image dividing unit 110 divides a LR input image 210 into units of horizontal lines (not illustrated) and acquires a plurality of input slice images 210a to 210n composed of a plurality of horizontal lines. That is, according to the present disclosure, each of the input slice images 210a to 210n is composed of a plurality of horizontal lines.

In the present disclosure, the reason why the input slice image is composed of a plurality of horizontal lines is as follows. If the input slice image is composed of single horizontal line, there is inevitably a limit to a performance of super-resolution because the performance of the super-resolution is proportional to the number of horizontal lines. On the other hands, if the input slice image is composed of a plurality of horizontal lines, it is possible to sustain a performance that is almost similar to the performance of the super-resolution in which a frame memory is used, and at the same time, it is easier to implement hardware because the frame memory does not needed.

In an embodiment, the image dividing unit 110 may divide the LR input image 210 into units of 15 horizontal lines. Accordingly, the image dividing unit 110 may generate the plurality of input slice images 210a to 210n each composed of 15 horizontal lines.

In the present disclosure, the reason why the LR input image is divided into the plurality of input slice images through the image dividing unit 110 is as follows. In a general SR technique using a CNN, many frame memories are required, and thus it is difficult to reduce the weight of the CNN so that it is difficult to implement a system-on-chip (SoC). However, as proposed in the present disclosure, when the slice images are used as input images, a frame memory may be replaced with a line memory, thereby making it easier to lighten the CNN 130 and to implement the SoC.

The image dividing unit 110 sequentially inputs the plurality of generated input slice images 210a to 210n as input images of the CNN 130 through the convolution operation unit 120.

Referring again to FIG. 1, the convolution operation unit 120 converts the LR input slice images into HR output slice images using the CNN 130. The convolution operation unit 120 performs a convolution operation and a residual operation performed through the CNN 130 to convert the LR input slice images into the HR output slice images. The convolution operation unit 120 provides the converted HR output slice images to the image concatenating unit 140.

When the LR input slice images are input from the convolution operation unit 120, the CNN 130 performs a plurality of convolution operations on the basis of the input slice images to generate an output feature map and upscales the output feature map to generate the HR output slice images.

Hereinafter, a configuration of the CNN 130 according to the present disclosure will be described in more detail with reference to FIG. 3.

Figure 3:
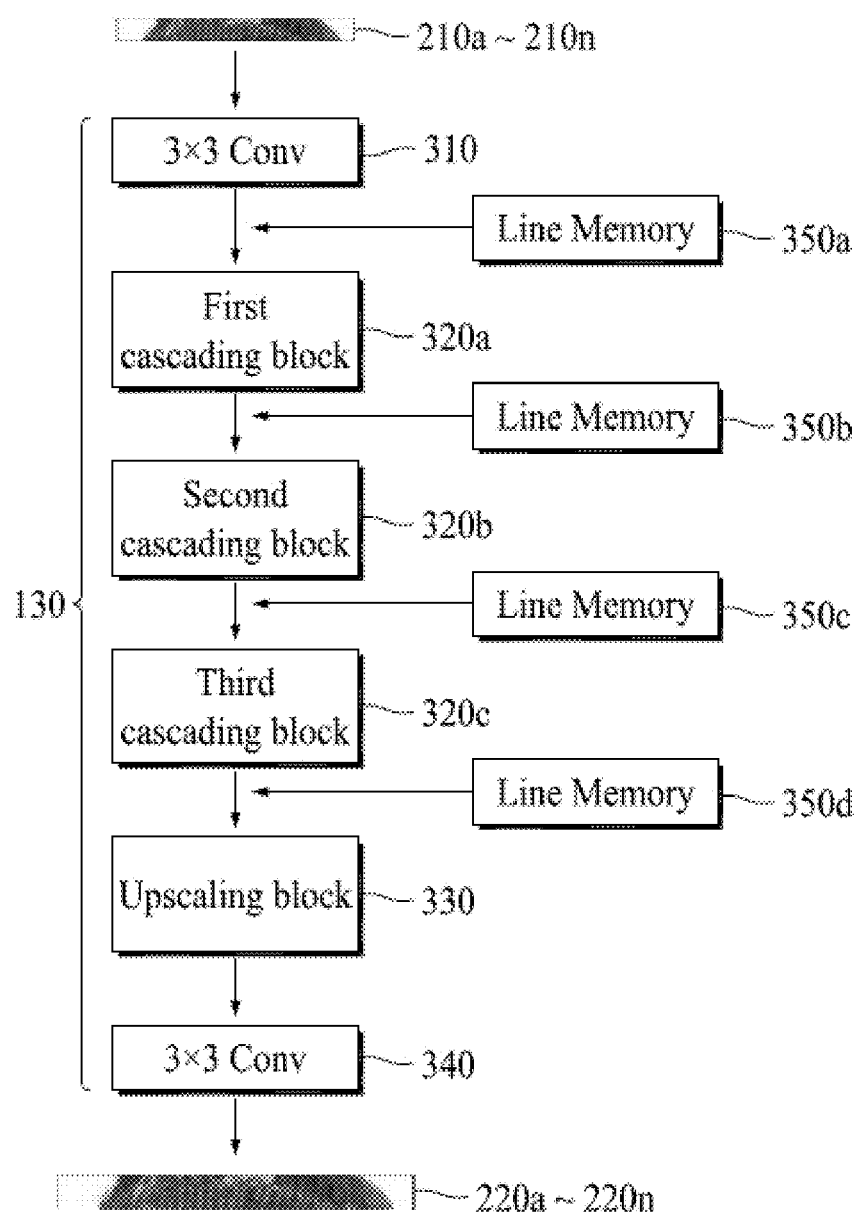
FIG. 3 is a schematic diagram illustrating a configuration of a convolution network illustrated in FIG. 1.

FIG. 3 is a schematic diagram illustrating a configuration of a convolution network according to an embodiment of the present disclosure. As illustrated in FIG. 3, the CNN 130 according to the embodiment of the present disclosure includes an input convolution layer 310, a plurality of cascading blocks 320a to 320c, an upscaling block 330, and an output convolution layer 340.

The input convolution layer 310 performs a convolution operation on the input slice images 210a to 210n using a predetermined input convolution filter to generate an input feature map for the input slice images 210a to 210n. In an embodiment, the input convolution filter may be a convolution filter having a square size. For example, the input convolution filter may be a convolution filter having a 3×3 size, as illustrated in FIG. 3.

According to the above-described embodiment, the number of channels of the input feature map may be determined by the number of channels of the input convolution filter. Specifically, when the input slice images 210a to 210n are composed of i channels and the input convolution filter is composed of j channels, the input feature map is composed of j channels. For example, when the input slice images 210a to 210n are composed of three channels R, G, and B and a size of the input convolution filter is 3×3×64, an input feature map composed of 64 channels is generated by the input convolution layer 310.

The plurality of cascading blocks 320a to 320c perform a convolution operation and a residual operation on the input feature map input to each of the cascading blocks 320a to 320c and generate an output feature map on the basis of results of the operations. Here, the residual operation refers to an operation in which an input value passes through several layers using a skip connection structure and then the sum of an output value and the input value is calculated so that a result value is obtained.

The reason why the CNN 130 according to the present disclosure includes the cascading blocks 320a to 320c for performing the residual operation and generating the output feature map is as follows. General CNN structures are trained using a back propagation technique and, as the network structure becomes deeper, a gradient value of a next layer may be reduced exponentially according to a degree of gradient of a previous layer.

Therefore, gradients near an output layer have values but gradients near an input layer have values close to zero, resulting in a gradient vanishing problem in which training is no longer progressed. Therefore, the CNN 130 according to the present disclosure includes the cascading blocks 320a to 320c capable of performing the residual operation to solve the gradient vanishing problem, and thus effective training may be performed even in a deep network structure.

In an embodiment, the plurality of cascading blocks 320a to 320c are connected in series as illustrated in FIG. 3, and thus an output feature map of a previous cascading block becomes an input feature map of a next cascading block.

In FIG. 3, the CNN 130 is described as including three cascading blocks 320a to 320c, but this is only an exemplary and, in a modified embodiment, the CNN 130 may include only two cascading blocks or include four or more cascading blocks. However, as the number of cascading blocks decreases, the accuracy of the output feature map decreases and, as the number of cascading blocks increases, an amount of computation increases, making it difficult to reduce the weight of the network. Therefore, the number of cascading blocks may be variably set in consideration of an environment to which the CNN 130 is applied.

Hereinafter, for convenience of description, it is assumed and described that the CNN 130 includes three cascading blocks 320a to 320c.

First, a first cascading block 320a is disposed at a rear end of the input convolution layer 310 and performs a convolution operation and a residual operation on the input feature map output from the input convolution layer 310 to generate a first output feature map on the basis of results of the operations. The first cascading block 320a inputs the first output feature map to a second cascading block 320b.

The second cascading block 320b is disposed at a rear end of the first cascading block 320a and performs a convolution operation and a residual operation on the first output feature map output from the first cascading block 320a to generate a second output feature map on the basis of results of the operations. The second cascading block 320b inputs the second output feature map to a third cascading block 320c.

The third cascading block 320c is disposed at a rear end of the second cascading block 320b and performs a convolution operation and a residual operation on the second output feature map output from the second cascading block 320b to generate a third output feature map on the basis of results of the operations. The third output feature map generated by the third cascading block 320c becomes a final output feature map and is input to the upscaling block 330.

Hereinafter, configurations of the cascading blocks 320a to 320c will be described in more detail with reference to FIG. 4. Since all of the configurations of the cascading blocks 320a to 320c are the same, an internal configuration will be described based on the first cascading block 320a in FIG. 4. Hereinafter, for convenience of description, the first cascading block 320a will be described as a cascading block 320.

Figure 4:
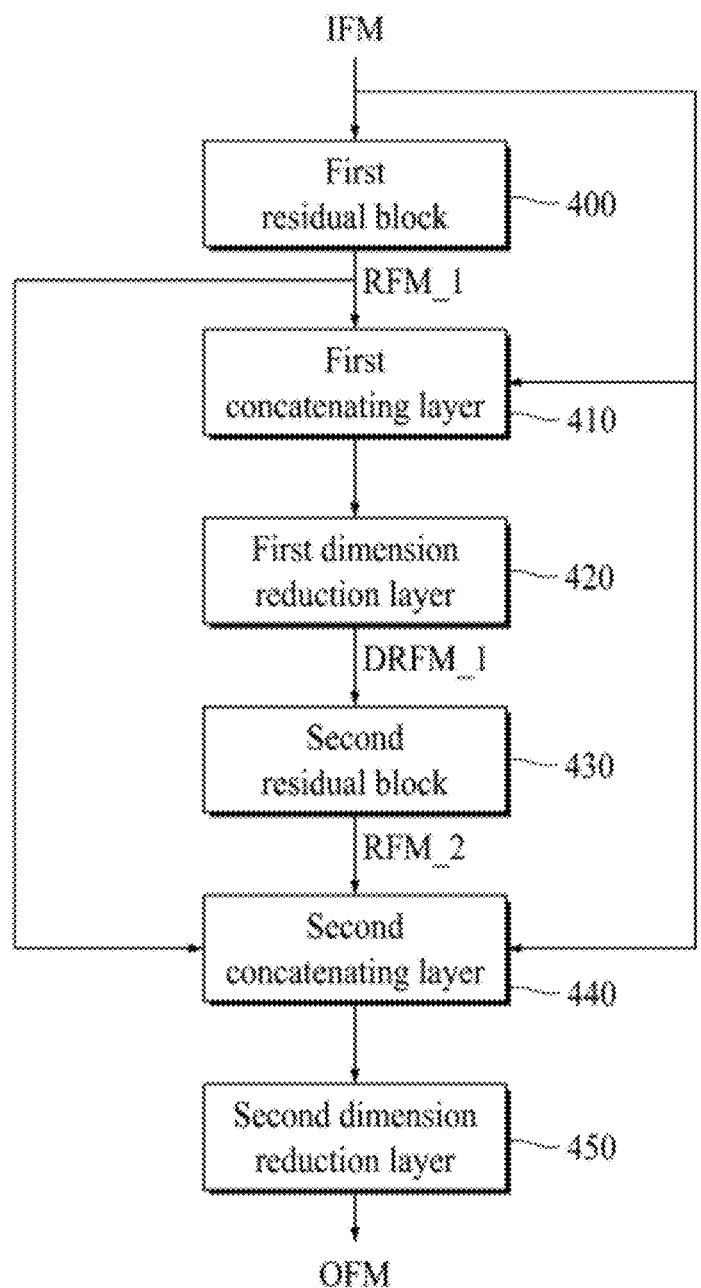
FIG. 4 is a block diagram illustrating a configuration of a cascading block illustrated in FIG. 3.

FIG. 4 is a schematic block diagram illustrating a configuration of a cascading block according to the present disclosure. As illustrated in FIG. 4, the cascading block 320 according to the present disclosure includes a first residual block 400, a first concatenating layer 410, a first dimension reduction layer 420, a second residual block 430, a second concatenating layer 440, and a second dimension reduction layer 450.

The first residual block 400 sequentially performs a group convolution operation using a first-type convolution filter and a point-wise convolution operation using a second-type convolution filter having a square size on an input feature map IFM, performs a residual operation on the basis of results of the operations, and generates a first residual feature map RFM_1. In an embodiment, the first-type convolution filter may be a filter in which a size of a vertical receptive field is smaller than a size of a horizontal receptive field, and the second-type convolution filter may be a filter having a square size in which a size of a vertical receptive field is identical to a size of a horizontal receptive field.

The reason why the first residual block 400 according to the present disclosure performs the group convolution using the first-type convolution filter in which the size of the vertical receptive field is smaller than the size of the horizontal receptive field is as follows. Generally, in the SR technique, since a size of a receptive field is directly related to the performance, it is common to increase the size of the receptive field.

However, as the size of the receptive field increases, an amount of information to be stored in the CNN increases. Therefore, in the present disclosure, by reducing the size of the vertical receptive field of the first-type convolution filter, a size of a feature map may be reduced in a vertical direction whenever the feature map passes through the first-type convolution filter, and the number of line memories required for storing the feature map may be reduced. For example, the first residual block 400 according to the present disclosure may use a filter in which a size of a vertical receptive field is one as a first-type convolution filter.

Figure 5A:
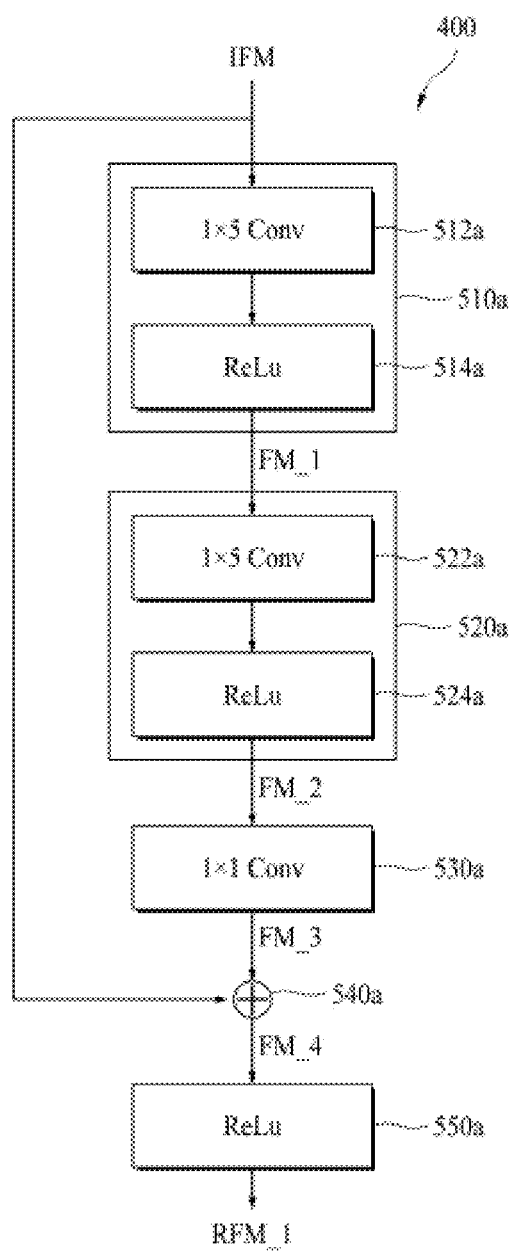
FIG. 5A is a block diagram illustrating a configuration of a first residual block illustrated in FIG. 4.

Hereinafter, the first residual block according to the present disclosure will be described in more detail with reference to FIG. 5A. FIG. 5A is a block diagram illustrating a configuration of a first residual block according to an embodiment of the present disclosure. As illustrated in FIG. 5A, a first residual block 400 according to the embodiment of the present disclosure includes a first group convolution block 510a, a second group convolution block 520a, a point-wise convolution block 530a, an operation unit 540a, and an output activation layer 550a.

In FIG. 5A, for convenience of description, the first and second group convolution blocks 510a and 520a are illustrated as using a first-type convolution filter having a size of 1×5, but a filter having a size of a vertical receptive field smaller than a size of a horizontal receptive field is sufficient as the first-type convolution filter, and thus the first-type convolution filter may have any size other than the size of 1×5.

The first group convolution block 510a performs a group convolution operation on an input feature map IFM and includes a first convolution layer 512a and a first activation layer 514a.

The first convolution layer 512a performs group convolution on the input feature map IFM using a first-type convolution filter having a size of 1×5 to generate a first feature map FM_1, and the first activation layer 514a applies an activation function to the first feature map FM_1 to non-linearize the first feature map FM_1.

In an embodiment, as illustrated in FIG. 5A, the first activation layer 514a applies a rectifier linear unit (ReLu) function, in which positive pixel values among pixel values of the first feature map FM_1 are output without change and negative pixel values are output as zero, to the first feature map FM_1 so that nonlinear characteristics may be imparted to the first feature map FM_1.

The second group convolution block 520a performs a group convolution operation on the first feature map FM_1 generated by the first group convolution block 510a and includes a second convolution layer 522a and a second activation layer 524a.

The second convolution layer 522a performs group convolution on the first feature map FM_1 using a first-type convolution filter having a size of 1×5 to generate a second feature map FM_2, and the second activation layer 524a applies an activation function to the second feature map FM_2 to non-linearize the second feature map FM_2. In an embodiment, the second activation layer 524a applies a ReLu function, in which positive pixel values among pixel values of the second feature map FM_2 are output without change and negative pixel values are output as zero, to the second feature map FM_2 so that nonlinear characteristics may be imparted to the second feature map FM_2.

As described above, according to the present disclosure, by performing the group convolution on the input feature map IMF through the first and second group convolution blocks 510a and 520a, the number of parameters and the amount of computation may be reduced and channels having high correlation for each group may be trained as compared to the conventional CNN.

The point-wise convolution block 530a performs point-wise convolution on the second feature map FM_2 using a point-wise convolution filter having a size of 1×1 to generate a third feature map FM_3. Unlike the first and second group convolution blocks 510a and 520a, the point-wise convolution block 530a does not handle spatial characteristics and performs an operation only between channels. Therefore, the point-wise convolution block 530a uses a point-wise convolution filter having a fixed size of 1×1, and thus a size of an output feature map is not changed and only the number of channels is adjusted.

As described above, according to the present disclosure, by combining the first and second group convolution blocks 510a and 520a and the point-wise convolution block 530a, the amount of computation may be reduced as compared to the conventional convolution operation.

The operation unit 540a calculates the sum of the third feature map FM_3 and the input feature map IFM to generate a fourth feature map FM_4. In the present disclosure, the reason why the sum of the third feature map FM_3 and the input feature map IFM is calculated through the operation unit 540a is to prevent a vanishing problem, which causes features to become blurred when the depth in the CNN increases and, at the same time, to simplify a matter to be trained by allowing a difference between the input feature map IFM and the third feature map FM_3 to be trained.

The output activation layer 550a applies an activation function to the fourth feature map FM_4 output from the operation unit 540a to non-linearize the fourth feature map FM_4 and generates a first residual feature map RFM_1. In an embodiment, the output activation layer 550a applies a ReLu function, in which positive pixel values among pixel values of the fourth feature map FM_4 are output without change and negative pixel values are output as zero, to the fourth feature map FM_4 so that nonlinear characteristics may be imparted to the fourth feature map FM_4.

Referring again to FIG. 4, the first concatenating layer 410 concatenates the input feature map IFM and the first residual feature map RFM_1 and inputs the concatenated feature maps to the first dimension reduction layer 420. For example, when the input feature map IFM has 64 channels and the first residual feature map RFM_1 has 64 channels, the first concatenating layer 410 concatenates the input feature map IFM and the first residual feature map RFM_1 to generate a concatenation result of 128 channels and inputs the generated concatenation result to the first dimension reduction layer 420.

The first dimension reduction layer 420 reduces a dimension of the concatenation result generated by the first concatenating layer 410 to the same dimension as the input feature map IFM to generate a first dimension reduction feature map DRFM_1. In an embodiment, the first dimension reduction layer 420 performs a convolution operation on the concatenation result using a dimension reduction convolution filter having a size of 1×1 and the same number of channels as the input feature map IFM to generate the first dimension reduction feature map DRFM_1. For example, when the concatenation result generated by the first concatenating layer 410 has 128 channels, the first dimension reduction layer 420 applies the dimension reduction convolution filter to the concatenation result to reduce a dimension of the concatenation result to 64 channels.

The second residual block 430 sequentially performs a group convolution operation using a third-type convolution filter and a point-wise convolution operation using a second-type convolution filter on the first dimension reduction feature map DRFM_1 input from the first dimension reduction layer 420 and performs a residual operation on the basis of results of the operations to generate a second residual feature map RFM_2. In an embodiment, the third-type convolution filter may be a filter in which a size of a vertical receptive field is identical to a size of a horizontal receptive field.

Unlike the first residual block 400, the second residual block 430 according to the present disclosure uses a third-type convolution filter in which a size of a vertical receptive field is identical to a size of a horizontal receptive field. This is because the performance of the CNN 130 may be reduced when a filter in which a size of a vertical receptive field is smaller than a size of a horizontal receptive field is repeatedly used.

However, in the second residual block 430 according to the present disclosure, even when the filter in which the size of the vertical receptive field is identical to the size of the horizontal receptive field is used, only horizontal padding is performed and vertical padding is not performed when the convolution operation is performed to minimize an increase in the number of line memories, and thus the size of the feature map may be reduced in a vertical direction whenever the feature map passes through the third-type convolution filter.

Figure 5B:
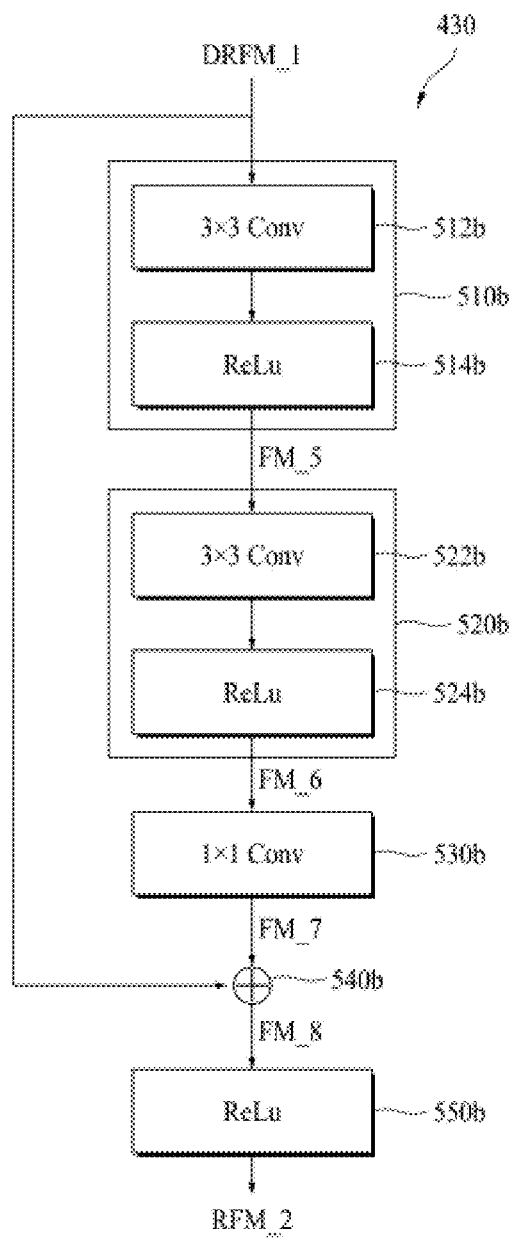
FIG. 5B is a block diagram illustrating a configuration of a second residual block illustrated in FIG. 4.

Hereinafter, the second residual block according to the present disclosure will be described in more detail with reference to FIG. 5B. FIG. 5B is a block diagram illustrating a configuration of a second residual block according to an embodiment of the present disclosure. As illustrated in FIG. 5B, a second residual block 430 according to the embodiment of the present disclosure includes a first group convolution block 510b, a second group convolution block 520b, a point-wise convolution block 530b, an operation unit 540b, and an output activation layer 550b.

In FIG. 5B, for convenience of description, the first and second group convolution blocks 510b and 520b are illustrated as using a third-type convolution filter having a size of 3×3, but a filter having a size of a vertical receptive field identical to a size of a horizontal receptive field is sufficient as the third-type convolution filter, and thus the third-type convolution filter may have any size other than the size of 3×3.

The first group convolution block 510b performs a group convolution operation on the first dimension reduction feature map DRFM_1 and includes a first convolution layer 512b and a first activation layer 514b.

The first convolution layer 512b performs group convolution on the first dimension reduction feature map DRFM_1 using a third-type convolution filter having a size of 3×3 to generate a fifth feature map FM_5, and the first activation layer 514b applies an activation function to the fifth feature map FM_5 to non-linearize the fifth feature map FM_5. In this case, when the group convolution is performed, the first convolution layer 512b performs only horizontal padding and does not perform vertical padding.

In an embodiment, as illustrated in FIG. 5B, the first activation layer 514b applies a ReLu function, in which positive pixel values among pixel values of the fifth feature map FM_5 are output without change and negative pixel values are output as zero, to the fifth feature map FM_5 so that nonlinear characteristics may be imparted to the fifth feature map FM_5.

The second group convolution block 520b performs a group convolution operation on the fifth feature map FM_5 generated by the first group convolution block 510b and includes a second convolution layer 522b and a second activation layer 524b.

The second convolution layer 522b performs group convolution on the fifth feature map FM_5 using a third-type convolution filter having a size of 3×3 to generate a sixth feature map FM_6, and the second activation layer 524b applies an activation function to the sixth feature map FM_6 to non-linearize the sixth feature map FM_6. In this case, when the group convolution is performed, the second convolution layer 522b performs only horizontal padding and does not perform vertical padding.

In an embodiment, the second activation layer 524b applies a ReLu function, in which positive pixel values among pixel values of the sixth feature map FM_6 are output without change and negative pixel values are output as zero, to the sixth feature map FM_6 so that nonlinear characteristics may be imparted to the sixth feature map FM_6.

As described above, according to the present disclosure, by performing the group convolution on the first dimension reduction feature map DRFM_1 through the first and second group convolution blocks 510b and 520b, the number of parameters and the amount of computation may be reduced and channels having high correlation for each group may be trained as compared to the conventional CNN.

The point-wise convolution block 530b performs point-wise convolution on the sixth feature map FM_6 using a point-wise convolution filter having a size of 1×1 to generate a seventh feature map FM_7. Unlike the first and second group convolution blocks 510b and 520b, the point-wise convolution block 530b does not handle spatial characteristics and performs an operation only between channels. Therefore, the point-wise convolution block 530b uses a point-wise convolution filter having a fixed size of 1×1, and thus a size of an output feature map is not changed and only the number of channels is adjusted.

As described above, according to the present disclosure, by combining the first and second group convolution blocks 510b and 520b and the point-wise convolution block 530b, the amount of computation may be reduced as compared to the conventional convolution operation.

The operation unit 540b calculates the sum of the seventh feature map FM_7 and the first dimension reduction feature map DRFM_1 to generate an eighth feature map FM_8. In the present disclosure, the reason why the sum of the seventh feature map FM_7 and the first dimension reduction feature map DRFM_1 is calculated through the operation unit 540b is to prevent a vanishing problem, which causes features to become blurred when the depth in the CNN increases and, at the same time, to simplify a matter to be trained by allowing a difference between the seventh feature map FM_7 and the first dimension reduction feature map DRFM_1 to be trained.

The output activation layer 550b applies an activation function to the eighth feature map FM_8 output from the operation unit 540b to non-linearize the eighth feature map FM_8 and generates a second residual feature map RFM_2. In an embodiment, the output activation layer 550b applies a ReLu function, in which positive pixel values among pixel values of the eighth feature map FM_8 are output without change and negative pixel values are output as zero, to the eighth feature map FM_8 so that nonlinear characteristics may be imparted to the eighth feature map FM_8.

In the above-described embodiment, the first residual block 400 and the second residual block 430 are described as using the ReLu function as the activation function for imparting nonlinear characteristics to the feature map, but this is only an exemplary, and the first residual block 400 and the second residual block 430 may impart the nonlinear characteristics to the feature map using another activation function rather than the ReLu function.

Referring again to FIG. 4, the second concatenating layer 440 concatenates the input feature map IFM, the first residual feature map RFM_1, and the second residual feature map RFM_2 and inputs the concatenated feature maps to the second dimension reduction layer 450. For example, when the input feature map IFM has 64 channels, the first residual feature map RMF_1 has 64 channels, and the second residual feature map RFM_2 has 64 channels, the second concatenating layer 440 concatenates the input feature map IFM, the first residual feature map RFM_1, and the second residual feature map RFM_2 to generate a concatenation result of 192 channels, and inputs the generated concatenation result to the second dimension reduction layer 450.

The second dimension reduction layer 450 reduces a dimension of the concatenation result generated by the second concatenating layer 440 to the same dimension as the input feature map IFM to generate an output feature map OFM. In an embodiment, the second dimension reduction layer 450 performs a convolution operation on the concatenation result using a dimension reduction convolution filter having a size of 1×1 and the same number of channels as the input feature map IFM to generate the output feature map OFM. For example, when the concatenation result generated by the second concatenating layer 440 has 192 channels, the second dimension reduction layer 450 applies the dimension reduction convolution filter to the concatenation result to reduce the dimension of the concatenation result to 64 channels.

Meanwhile, the upscaling device 100 according to the present disclosure may further include a plurality of line memories 350a to 350d each disposed at at least one of input ends and output ends of the cascading blocks 320a to 320c, as illustrated in FIG. 3. Each of the line memories 350a to 350d may store at least one of the feature map input to each of the cascading blocks 320a to 320c and the feature map output from each of the cascading blocks 320a to 320c in units of lines.

For example, the feature map input to the first cascading block 320a is stored in the first line memory 350a in units of lines, the feature map output from the first cascading block 320a is stored in the second line memory 350b, the feature map output from the second cascading block 320b is stored in the third line memory 350c, and the feature map output from the third cascading block 320c is stored in the fourth line memory 350d.

In this case, as described above, each of the cascading blocks 320a to 320c uses the first-type convolution filter having a size of 1×5 when the convolution operation is performed to reduce the size of the feature map in the vertical direction and thus the number of line memories 350a to 350d may be reduced, and each of the cascading blocks 320a to 320c does not perform vertical padding when the convolution operation using the third-type convolution filter having a size of 3×3 is performed, and thus an increase in the number of line memories 350a to 350d may be minimized.

Referring again to FIG. 3, the upscaling block 330 upscales the output feature map OFM output from the third cascading block 320c. Hereinafter, the upscaling block according to the present disclosure will be described in detail with reference to FIG. 6.

Figure 6:
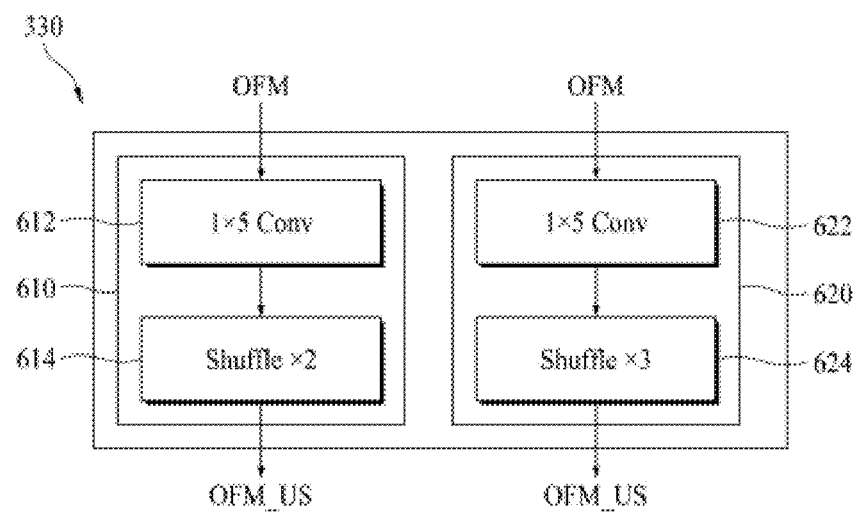
FIG. 6 is a block diagram illustrating a configuration of an upscaling block illustrated in FIG. 4.

FIG. 6 is a block diagram illustrating a configuration of an upscaling block according to an embodiment of the present disclosure. As illustrated in FIG. 6, the upscaling block 330 according to the present disclosure may include a first upscaling block 610 and a second upscaling block 620.

The first upscaling block 610 performs a convolution operation using the first-type convolution filter and a first shuffle operation on an output feature map OFM to upscale the output feature map OFM by a factor of p. In an embodiment, as illustrated in FIG. 6, the first shuffle operation may be a pixel shuffle operation capable of upscaling the output feature map OFM by a factor of two, and the output feature map OFM is upscaled by a factor of two through the first shuffle operation.

Specifically, the first upscaling block 610 increases the number of output feature maps OFM to p-squared through a first upscaling convolution layer 612, and performs upscaling by arranging pixels included in the p-squared output feature maps OFM in the feature map upscaled by a factor of p through a first shuffle layer 614.

For example, when p is two, the first upscaling block 610 may increase the number of output feature maps OFM to four, which is the square of p, through the first upscaling convolution layer 612, and perform upscaling by arranging a pixel at a position (1,1) of a first output feature map among four output feature maps OFM as a pixel at a position (1,1) of a feature map to be output, arranging a pixel at a position (1,1) of a second output feature map as a pixel at a position (1,2) of the feature map to be output, arranging a pixel at a position (1,1) of a third output feature map as a pixel at a position (2,1) of the feature map to be output, and arranging a pixel at a position (1,1) of a fourth output feature map as a pixel at a position (2,2) of the feature map to be output, through the first shuffle layer 614.

The second upscaling block 620 performs a convolution operation using the first-type convolution filter and a second shuffle operation on the output feature map OFM to upscale the output feature map OFM by a factor of q. In an embodiment, as illustrated in FIG. 6, the second shuffle operation may be a pixel shuffle operation capable of upscaling the output feature map OFM by a factor of three and, accordingly, the output feature map OFM is upscaled by a factor of three.

Specifically, the second upscaling block 620 increases the number of output feature maps OFM to q-squared through a second upscaling convolution layer 622 and performs upscaling by arranging pixels included in the q-squared output feature maps OFM in the feature map upscaled by a factor of q through a second shuffle layer 624.

For example, when q is three, the second upscaling block 620 may increase the number of output feature maps OFM to nine, which is the square of q, through the second upscaling convolution layer 622 and perform upscaling by arranging a pixel at a position (1,1) of a first output feature map among nine output feature maps OFM as a pixel at a position (1,1) of a feature map to be output, arranging a pixel at a position (1,1) of a second output feature map as a pixel at a position (1,2) of the feature map to be output, and arranging a pixel at a position (1,1) of a third output feature map as a pixel at a position (1,3) of the feature map to be output, through the second shuffle layer 624.

Further, the second upscaling block 620 may perform upscaling by arranging a pixel at a position (1,1) of a fourth output feature map as a pixel at a position (2,1) of the feature map to be output, arranging a pixel at a position (1,1) of a fifth output feature map as a pixel at a position (2,2) of the feature map to be output, and arranging a pixel at a position (1,1) of a sixth output feature map as a pixel at a position (2,3) of the feature map to be output, through the second shuffle layer 624.

Further, the second upscaling block 620 may perform upscaling by arranging a pixel at a position (1,1) of a seventh output feature map as a pixel at a position (3,1) of the feature map to be output, arranging a pixel at a position (1,1) of an eighth output feature map as a pixel at a position (3,2) of the feature map to be output, and arranging a pixel at a position (1,1) of a ninth output feature map as a pixel at a position (3,3) of the feature map to be output, through the second shuffle layer 624.

In FIG. 6, the upscaling block 330 is described as including the first and second upscaling blocks 610 and 620, but the upscaling block 330 according to the present disclosure may further include a third upscaling block 630 which upscales the output feature map by a factor of r by connecting a plurality of upscaling blocks, each of which includes at least one of the first upscaling block 610 and the second upscaling block 620, in series.

Figure 7:
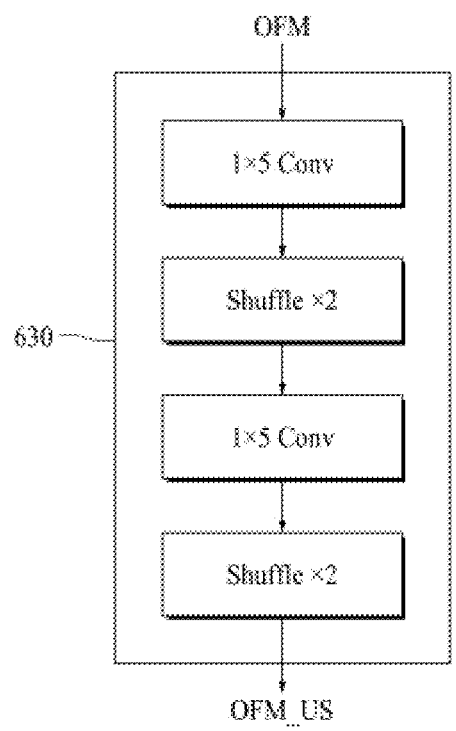
FIG. 7 is an exemplary block diagram illustrating a method of upscaling an output feature map by a factor of four by connecting two first upscaling blocks illustrated in FIG. 6 in series.

For example, when the third upscaling block 630 upscales the output feature map OFM by a factor of four, the third upscaling block 630 continuously performs the convolution operation using the first-type convolution filter and the second shuffle operation twice on the output feature map OFM to upscale the output feature map OFM by a factor of four, as illustrated in FIG. 7.

Referring again to FIG. 3, the output convolution layer 340 performs a convolution operation using a predetermined output convolution filter on an upscaled output feature map OFM_US to reduce the number of channels of the upscaled output feature map OFM_US. Accordingly, output slice images 220a to 220n having the same number of channels as the input slice image are generated.

In an embodiment, the output convolution filter may be a convolution filter having a square size. For example, the output convolution filter may be a convolution filter having a size of 3×3, as illustrated in FIG. 3.

According to the above-described embodiment, when the upscaled output feature map OFM_US is composed of j channels and the output convolution filter is composed of i channels, the output slice images 220a to 220n are composed of i channels. For example, when the upscaled output feature map OFM_US is composed of 64 channels and the output convolution filter is composed of three channels, output slice images 220a to 220n having three channels are generated by the output convolution layer 340.

Referring again to FIG. 1, when the output slice images 220a to 220n generated to respectively correspond to the input slice images 210a to 210n are output from the convolution operation unit 120, the image concatenating unit 140 sequentially concatenates the output slice images 220a to 220n to generate a HR output image 220. For example, as illustrated in FIG. 2, the image concatenating unit 140 sequentially concatenates the plurality of output slice images 220a to 220n output from the convolution operation unit 120 to generate the HR output image 220.

The training unit 150 trains the CNN 130 using a predetermined training image to optimize parameters of a convolution filter of each of the layers constituting the CNN 130. In this case, the training unit 150 may use an image patch having a size of k×k as the training image.

In an embodiment, when the training unit 150 trains the CNN 130, the training unit 150 may use two loss functions, that is, $L_{pixel}$, which is a first loss function, and $L_{relation}$, which is a second loss function, as described in Equation 1 below, and train the CNN 130 so as to reduce a difference between the output image acquired based on the training image and the HR original image corresponding to the training image.

$$L_{total}=L_{pixel}+\lambda \times L_{relation} \qquad \text{[Equation 1]}$$

In Equation 1, $L_{pixel}$ denotes a loss function for which the output image acquired based on the training image and the HR original image corresponding to the training image are compared in units of pixels so that the CNN 130 is trained to reduce the difference therebetween, and a smoothL1 function described in Equation 2 below may be used.

$$L_{smoothL1} = \begin{cases} 0.5x^2 & \text{if } |x| < 1 \\ |x| - 0.5 & \text{otherwise} \end{cases} \qquad \text{[Equation 2]}$$

In Equation 2, x denotes a difference in pixel values between the HR original image and the output image. In the loss function described in Equation 2, a region in which the difference in pixel values between the HR original image and the output image is less than one, that is, a region with a small number of errors, is a curve and the other regions are straight lines. Therefore, when the number of errors is small, a loss value is reduced rapidly.

As described above, in the present disclosure, the smoothL1 function is used as the first loss function, and thus a delay in the CNN 130 may be minimized.

Meanwhile, in Equation 1, $L_{relation}$ denotes a loss function for which the CNN 130 is trained so as to reduce a difference between first similarity between the pixels of the HR original image and second similarity between the pixels of the HR output image output from the convolution network on the basis of the training image and may be defined as in Equation 3 below.

$$L_{relation} = \frac{1}{N}\sum_{k}^{N}\left|relation_k^{hr} - relation_k^{sr}\right| \qquad \text{[Equation 3]}$$

In Equation 3, $relation_k^{hr}$ denotes the first similarity between the pixels included in the HR original image and is defined as in Equation 4 below, and $realtion_k^{sr}$ denotes the second similarity between the pixels of the HR output image output from the CNN 130 on the basis of the training image and is defined as in Equation 5 below.

$$relation_k^{HR} = \frac{1}{C(x^{HR})}\sum_{\forall j} e^{\left(x_i^{HR}\right)^T x_j^{HR}} \qquad \text{[Equation 4]}$$

$$relation_k^{SR} = \frac{1}{C(x^{SR})}\sum_{\forall j} e^{\left(x_i^{SR}\right)^T x_j^{SR}} \qquad \text{[Equation 5]}$$

In Equation 4 and 5, $C(x^{HR})$ and $C(x^{SR})$ denote normalization factors, i denotes a specific pixel in each image, and j denotes all possible pixels in each image.

Meanwhile, in Equation 1, a weight $\lambda$ reflected in the second loss function is set to a value less than one for stable image expression and thus may allow a reflection ratio of the second loss function to be smaller than a reflection ratio of the first loss function.

As described above, according to the present disclosure, the CNN 130 may be trained so as to reduce the difference between the first similarity obtained from the HR original image and the second similarity obtained from the HR output image by additionally using the second loss function, and thus it is possible to minimize performance degradation even without a separate additional module.

Figure 8A:
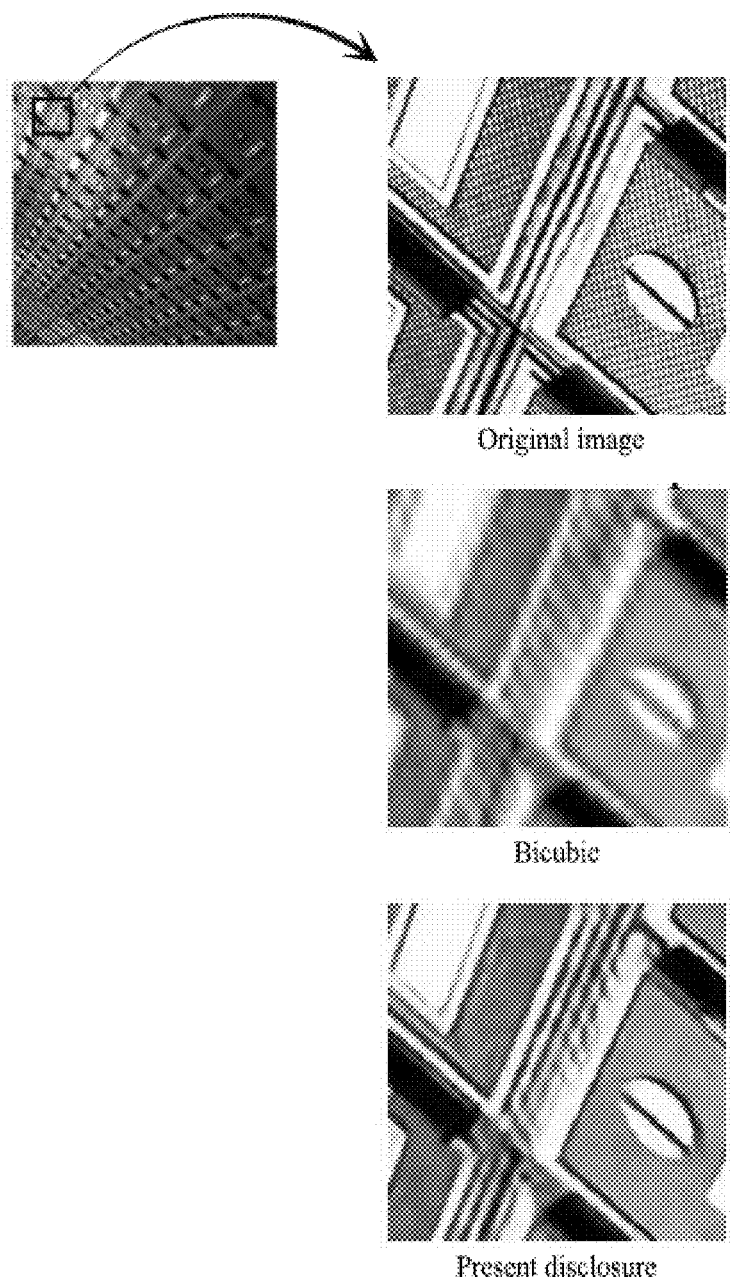
FIG. 8A is an exemplary diagram illustrating the comparison of an output image converted to have high resolution according to the present disclosure with a high-resolution original image and an output image which is converted by another algorithm.
Figure 8B:
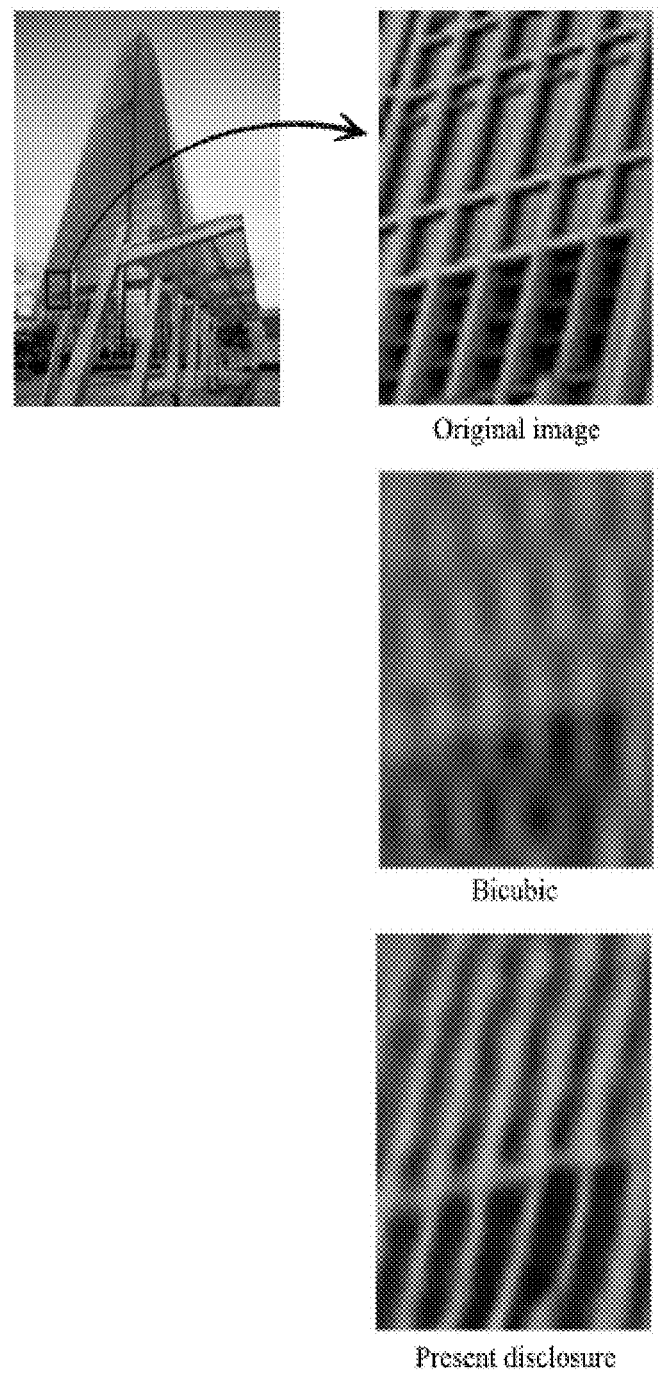
FIG. 8B is another exemplary diagram illustrating the comparison of an output image converted to have high resolution according to the present disclosure with a high-resolution original image and an output image which is converted by another algorithm.

FIGS. 8A and 8B are exemplary diagrams illustrating the comparison of an output image converted to have high resolution according to the present disclosure with a HR original image and an output image which is converted by another algorithm. As illustrated in FIGS. 8A and 8B, it can be seen that a method according to the present disclosure has superior image quality compared to a method using bicubic interpolation, which is another algorithm.

The upscaling device 100 described above may be applied to a display device. In this case, the upscaling device 100 may be included in a timing controller of the display device or may be mounted on a board, on which a timing controller is mounted, together with the timing controller.

Hereinafter, a method of upscaling resolution based on a slice image according to the present disclosure will be described with reference to FIG. 9.

Figure 9:
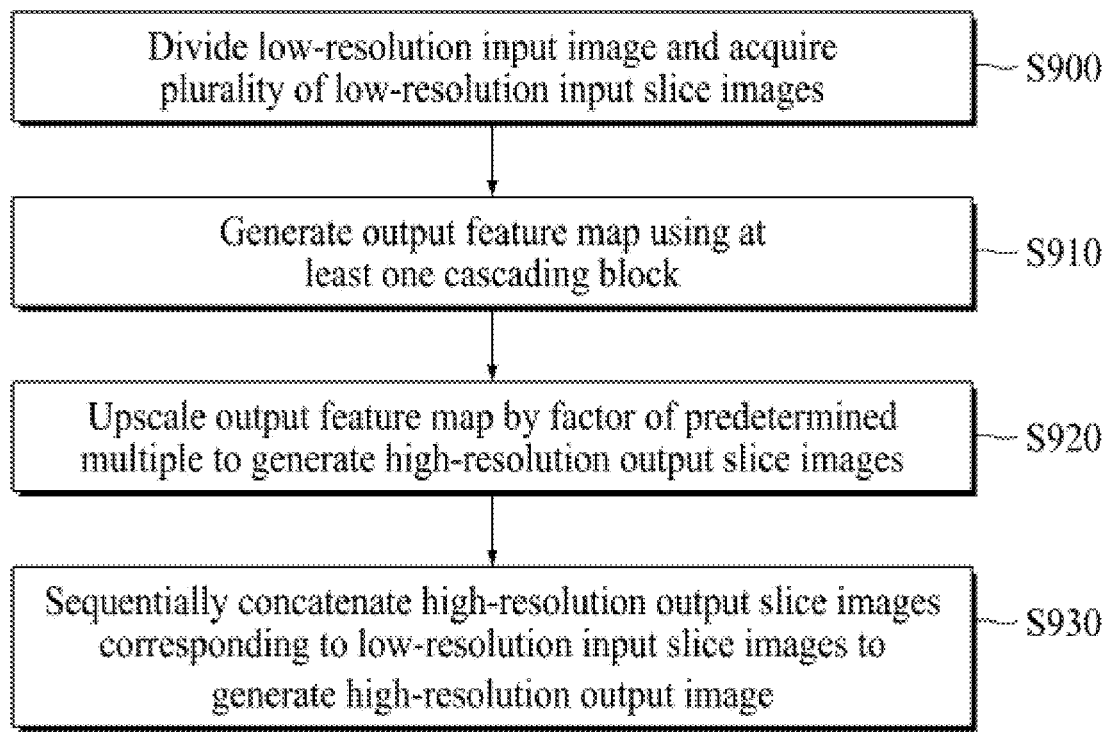
FIG. 9 is a flowchart illustrating a method of upscaling resolution based on a slice image according to an embodiment of the present disclosure.

FIG. 9 is a flowchart illustrating a method of upscaling resolution based on a slice image according to an embodiment of the present disclosure. The method of upscaling resolution based on a slice image illustrated in FIG. 9 may be performed by the upscaling device illustrated in FIG. 1.

First, the upscaling device divides a LR input image to acquire a plurality of input slice images (S900). In an embodiment, the upscaling device may divide the LR input image into units of horizontal lines (e.g., 15 horizontal lines) to acquire input slice images composed of a plurality of horizontal lines.

As described above, according to the present disclosure, since the slice image is used as an input image, a frame memory may be replaced with a line memory, thereby making it easier to lighten a CNN and to implement a SoC.

Thereafter, the upscaling device generates an output feature map using at least one of the cascading blocks included in the CNN (S910). Specifically, the upscaling device acquires an input feature map from the input slice images, and performs a convolution operation and a residual operation using a convolution filter having a predetermined size on the acquired input feature map to generate the output feature map.

A method of generating an output feature map using a cascading block, which is performed by the upscaling device according to the present disclosure, will be described in more detail with reference to FIG. 10.

Figure 10:
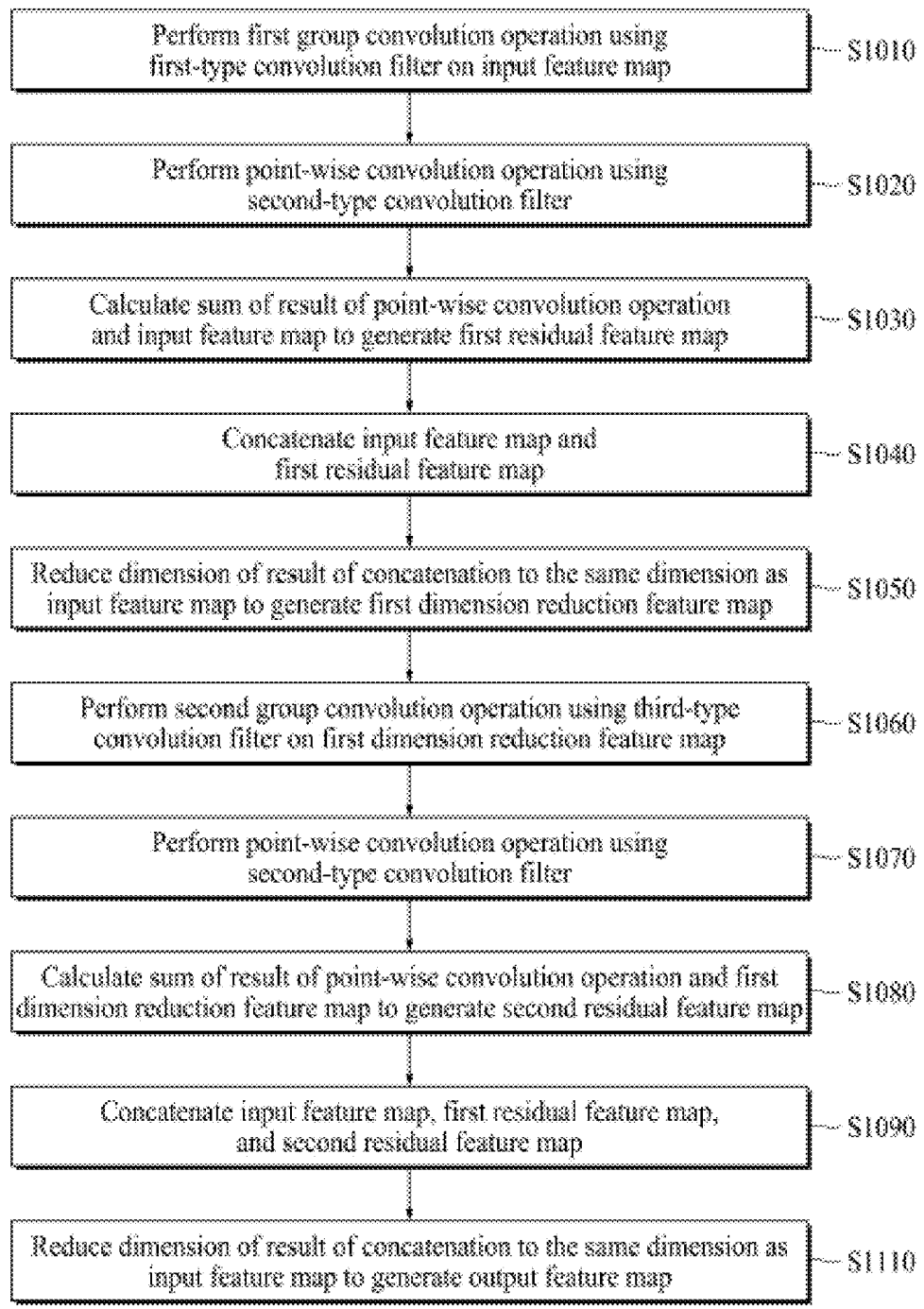
FIG. 10 is a flowchart illustrating a method of generating an output feature map using a cascading block, which is performed by an upscaling device according to the present disclosure.

FIG. 10 is a flowchart illustrating a method of generating an output feature map using a cascading block, which is performed by an upscaling device according to the present disclosure.

First, the upscaling device performs a first group convolution operation using a first-type convolution filter on an input feature map (S1010). In an embodiment, the first-type convolution filter may be a filter in which a size of a vertical receptive field is smaller than a size of a horizontal receptive field. For example, the first-type convolution filter may be a filter having a size of 1×5.

The reason why the upscaling device uses the first-type convolution filter in which the size of the vertical receptive field is smaller than the size of the horizontal receptive field when the upscaling device performs the first group convolution operation is to reduce a size of a feature map in a vertical direction whenever the feature map passes through the first-type convolution filter by reducing the size of the vertical receptive field so that the number of line memories required for storing the feature map is reduced.

In an embodiment, the upscaling device may repeatedly perform the first group convolution operation multiple times and may non-linearize a result of the group convolution operation using an activation function such as a ReLu function after each first group convolution is performed.

Thereafter, the upscaling device performs a point-wise convolution operation using a second-type convolution filter having a square size on the result of the first group convolution operation (S1020). In an embodiment, the second-type convolution filter may be a filter having a square size in which a size of a vertical receptive field is identical to a size of a horizontal receptive field. For example, the second-type convolution filter may be a filter having a size of 1×1.

Thereafter, the upscaling device calculates the sum of a result of the point-wise convolution operation acquired in S1020 and the input feature map to generate a first residual feature map (S1030). As described above, by calculating of the sum of the result of the point-wise convolution operation and the input feature map, a vanishing problem in which features become blurred as a depth of the CNN increases may be prevented.

Thereafter, the upscaling device concatenates the input feature map and the first residual feature map (S1040) and then reduces a dimension of a result of the concatenation to the same dimension as the input feature map to generate a first dimension reduction feature map (S1050).

Thereafter, the upscaling device performs a second group convolution operation using a third-type convolution filter on the first dimension reduction feature map (S1060). In an embodiment, the third-type convolution filter may be a filter in which a size of a vertical receptive field is identical to a size of a horizontal receptive field. For example, the third-type convolution filter may be a filter having a size of 3×3.

In the present disclosure, the third-type convolution filter in which the size of the vertical receptive field is identical to the size of the horizontal receptive field is used when the second group convolution operation is performed. This is because the performance of the CNN may be reduced when the filter in which a size of a vertical receptive field is smaller than a size of a horizontal receptive field is repeatedly used.

However, in the present disclosure, even when the filter in which the size of the vertical receptive field is identical to the size of the horizontal receptive field is used, only horizontal padding is performed and vertical padding is not performed when the second group convolution operation is performed to minimize an increase in the number of line memories, and thus the size of the feature map may be reduced in the vertical direction whenever the feature map passes through the third-type convolution filter.

Thereafter, the upscaling device performs a point-wise convolution operation using a second-type convolution filter (S1070) and calculates the sum of a result of the point-wise convolution operation acquired in S1070 and the first dimension reduction feature map to generate a second residual feature map (S1080).

Thereafter, the upscaling device concatenates the input feature map, the first residual feature map, and the second residual feature map (S1090) and reduces a dimension of the result of the concatenation to the same dimension as the input feature map to generate an output feature map (S1110).

Meanwhile, in the above-described embodiment, when the CNN includes first to third cascading blocks, a first cascading block performs a convolution operation and a residual operation on an input feature map acquired from the input slice image to generate a first output feature map, a second cascading block performs a convolution operation and a residual operation on the first output feature map to generate a second output feature map, and a third cascading block performs a convolution operation and a residual operation on the second output feature map to generate a final output feature map.

Referring again to FIG. 9, the upscaling device upscales the output feature map generated in S910 by a factor of a predetermined multiple to generate a HR output slice image (S920).

In an embodiment, the upscaling device may sequentially perform a convolution operation using a first-type convolution filter and a shuffle operation on the output feature map to upscale the output feature map by the factor of a predetermined multiple. The first-type convolution filter has a size of a vertical receptive field being smaller than a size of a horizontal receptive field.

For example, when upscaling by a factor of p is required, the upscaling device may increase the number of output feature maps to p-squared through the convolution operation using the first-type convolution filter, and perform upscaling by arranging pixels included in the p-squared output feature maps in the upscaled feature map through the shuffle operation.

Thereafter, the upscaling device sequentially concatenates the output slice images corresponding to the input slice images to generate a HR output image (S930).

Meanwhile, although not illustrated in FIG. 9, the method of upscaling resolution based on a slice image according to the present disclosure may further include a process of training a CNN using a predetermined training image.

In this case, the CNN may be trained using the loss functions defined by Equations 1 to 4 described above so as to reduce a difference between an output image acquired based on the training image and a HR original image corresponding to the training image. Since the content of the loss functions has been described in detail in Equations 1 to 4 described above, a detailed description thereof will be omitted.

According to the present disclosure, since a LR input image is divided into a plurality of input slice image and the divided input slice images are upscaled and then concatenated to acquire a HR output image, a system can be implemented with only line memories without a frame memory and, accordingly, a convolution network can be lightened so that a SoC can be easily implemented.

Further, according to the present disclosure, since a residual block performs a convolution operation using a convolution filter in which a size of a vertical receptive field is smaller than a size of a horizontal receptive field, the size of the vertical receptive field can be reduced. Accordingly, the number of line memories required for implementing a system can be reduced so that reduction of a weight of a convolution network can be maximized.

Further, according to the present disclosure, when a convolution layer uses a convolution filter having a size of 3×3 in a residual block, vertical padding is not performed so that the number of line memories that increases with more passes through the convolution layer can be reduced.

Further, according to the present disclosure, when a convolution network is trained, a Smooth L1 function is used as a loss function so that network delay can be minimized, and the performance of the convolution network can be improved without an additional separate module by additionally using a similarity loss function defined as a difference between first similarity between pixels included in a HR original image and second similarity between pixels included in a HR output image output from the convolution network.

It should be understood by those skilled in the art that the present disclosure can be embodied in other specific forms without changing the technical concept and essential features of the present disclosure.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A device for upscaling resolution based on a slice image, the device comprising:
a convolution operation unit implemented with a processor configured to convert a low-resolution input slice image into a high-resolution output slice image using a convolutional neural network,
wherein the convolutional neural network includes:
a cascading block configured to perform a convolution operation and a residual operation using a convolution filter having a predetermined size on an input feature map generated from the low-resolution input slice image to generate an output feature map; and
an upscaling block configured to upscale the output feature map to generate the high-resolution output slice image,
wherein the upscaling block is configured to:
perform a first convolution operation using a first-type convolution filter and a shuffle operation on the output feature map to upscale the output feature map by a factor of a predetermined multiple and,
wherein the first-type convolution filter has a size of a vertical receptive field being smaller than a size of a horizontal receptive field.

2. The device of claim 1, wherein the cascading block includes:
a first residual block configured to sequentially perform a group convolution operation using the first-type convolution filter, in which a size of a vertical receptive field is smaller than a size of a horizontal receptive field, and a point-wise convolution operation using a second-type convolution filter having a square size on the input feature map and perform the residual operation on a basis of results of the operations to generate a first residual feature map; and a first dimension reduction layer configured to concatenate the input feature map and the first residual feature map and reduce a dimension of a result of the concatenation to a same dimension as the input feature map to generate a first dimension reduction feature map.

3. The device of claim 2, wherein the first-type convolution filter is a filter having a size of 1×5, and
the second-type convolution filter is a filter having a size of 1×1.

4. The device of claim 2, further comprising:
a second residual block, which is connected to the first dimension reduction layer in series, sequentially performs a group convolution operation using a third-type convolution filter having a square size and a point-wise convolution operation using the second-type convolution filter on the first dimension reduction feature map and performs the residual operation on the basis of results of the operations to generate a second residual feature map; and
a second dimension reduction layer configured to concatenate the input feature map, the first residual feature map, and the second residual feature map and reduce a dimension of a result of the concatenation to the same dimension as the input feature map to generate the output feature map.

5. The device of claim 4, wherein the third-type convolution filter is a filter having a size of 3×3, and
when the second residual block performs the group convolution operation using the third-type convolution filter, the second residual block performs horizontal padding on the first dimension reduction feature map and does not perform vertical padding.

6. The device of claim 4, wherein the first residual block and the second residual block repeatedly perform the group convolution operation multiple times and non-linearize each result obtained by performing the group convolution operation using an activation function.

7. The device of claim 1, wherein the convolutional neural network includes n cascading blocks, and
the n cascading blocks are connected in series so that an output feature map of an $(n-1)^{th}$ cascading block becomes an input feature map of an nth cascading block.

8. The device of claim 7, further comprising a line memory which is disposed at at least one of an input end and an output end of each cascading block and stores at least one of an input feature map input to the cascading block and an output feature map output from the cascading block in units of lines.

9. The device of claim 1, wherein the upscaling block includes:
a first upscaling block configured to perform a second convolution operation using a first-type convolution filter, in which a size of a vertical receptive field is smaller than a size of a horizontal receptive field, and a first shuffle operation on the output feature map to upscale the output feature map by a factor of p; and
a second upscaling block configured to perform a third convolution operation using the first-type convolution filter and a second shuffle operation on the output feature map to upscale the output feature map by a factor of q.

10. The device of claim 9, wherein the upscaling block further includes a third upscaling block which upscales the output feature map by a factor of r by connecting a plurality of upscaling blocks in series and, wherein the plurality of upscaling block include at least one of the first upscaling block and the second upscaling block.

11. The device of claim 1, further comprising:
an image dividing unit implemented with a processor configured to divide the low-resolution input image in units of a plurality of horizontal lines to acquire a plurality of low-resolution input slice images composed of the plurality of horizontal lines; and
an image concatenating unit implemented with a processor configured to concatenate high-resolution output slice images output from the convolution operation unit to correspond to the low-resolution input slice images to generate a high-resolution output image.

12. The device of claim 1, further comprising a training unit implemented with a processor configured to train the convolutional neural network using a predetermined training image,
wherein the training unit the convolutional neural network so that a difference between a first similarity between two pixels included in a high-resolution original image with respect to the training image and a second similarity between two pixels included in a high-resolution output image output from the convolution network on a basis of the training image is reduced.

13. The device of claim 12, wherein the training unit trains the convolutional neural network using a first loss function defined as an equation $$L_{smoothL1} = \begin{cases} 0.5x^2 & \text{if } |x| < 1 \\ |x| - 0.5 & \text{otherwise} \end{cases}$$

and a second loss function defined as an equation $$L_{relation} = \frac{1}{N}\sum_{k}^{N}\left|relation_k^{hr} - relation_k^{sr}\right|,$$

in the equations, x denotes a difference in pixel value between the high-resolution original image and the high-resolution output image, $relation_k^{hr}$ denotes the first similarity and is defined as an equation $$relation_k^{HR} = \frac{1}{C(x^{HR})}\sum_{\forall j}e^{(x_i^{HR})^T x_j^{HR}},$$

denotes the second similarity and is defined as an equation $$relation_k^{SR} = \frac{1}{C(x^{SR})}\sum_{\forall j}e^{(x_i^{SR})^T x_j^{SR}},$$

$C(x^{HR})$ and $C(x^{SR})$ denote normalization factors, i denotes a specific pixel in each image, and j denotes all possible pixels in each image.

14. A method of upscaling resolution based on a slice image, the method comprising:
dividing a low-resolution input image and acquiring a plurality of low-resolution input slice images;

performing a convolution operation and a residual operation using a convolution filter having a predetermined size on an input feature map generated from the low-resolution input slice images through a convolutional neural network and generating an output feature map;

upscaling the output feature map and generating high-resolution output slice images; and sequentially concatenating the high-resolution output slice images corresponding to the low-resolution input slice images and generating a high-resolution output image, wherein the generating of the high-resolution output slice images includes performing a first convolution operation using a first-type convolution filter and a shuffle operation on the output feature map to upscale the output feature map by a factor of a predetermined multiple and, wherein the first-type convolution filter has a size of a vertical receptive field being smaller than a size of a horizontal receptive field.

15. The method of claim 14, wherein the generating of the output feature map includes:

performing a second convolution operation and a first residual operation using the first-type convolution filter, in which a size of a vertical receptive field is smaller than a size of a horizontal receptive field, on the input feature map to generate a first residual feature map;

performing a third convolution operation and a second residual operation using a second-type convolution filter having a square size on the feature map generated based on a result of concatenation of the input feature map and the first residual feature map to generate a second residual feature map; and generating the output feature map on a basis of a result of concatenation of the input feature map, the first residual feature map, and the second residual feature map.

16. The method of claim 15, wherein the performing of the first and second convolution operations includes performing a group convolution operation at least once and a point-wise convolution operation.

17. The method of claim 15, wherein the first-type convolution filter is a filter having a size of 1×5, and the second-type convolution filter is a filter having a size of 3×3.

18. The method of claim 15, wherein the performing of the third convolution operation includes performing a horizontal padding operation without a vertical padding operation.

19. The method of claim 14, further comprising training the convolutional neural network using a predetermined training image, wherein, when the convolutional neural network is trained, the convolutional neural network is trained using a first loss function defined as an equation $$L_{smoothL1} = \begin{cases} 0.5x^2 & \text{if } |x| < 1 \\ |x| - 0.5 & \text{otherwise} \end{cases}$$

and a second loss function defined as an equation $$L_{relation} = \frac{1}{N}\sum_{k}^{N}\left|\text{relation}_k^{hr} - \text{relation}_k^{sr}\right|,$$

in the equations, x denotes a difference in pixel value between a high-resolution original image with respect to the training image and the high-resolution output image output from the convolutional neural network on a basis of the training image, $\text{relation}_k^{hr}$ denotes a first similarity between pixels included in the high-resolution original image and is defined as an equation $$\text{relation}_k^{HR} = \frac{1}{C(x^{HR})}\sum_{\forall j}e^{(x_i^{HR})^T x_j^{HR}},$$

$\text{relation}_k^{sr}$ denotes a second similarity between pixels included in the high-resolution output image and is defined as an equation $$\text{relation}_k^{SR} = \frac{1}{C(x^{SR})}\sum_{\forall j}e^{(x_i^{SR})^T x_j^{SR}},$$

$C(x^{HR})$ and $C(x^{SR})$ denote normalization factors, i denotes a specific pixel in each image, and j denotes all possible pixels in each image.

* * * * *